Patented Feb. 22, 1927.

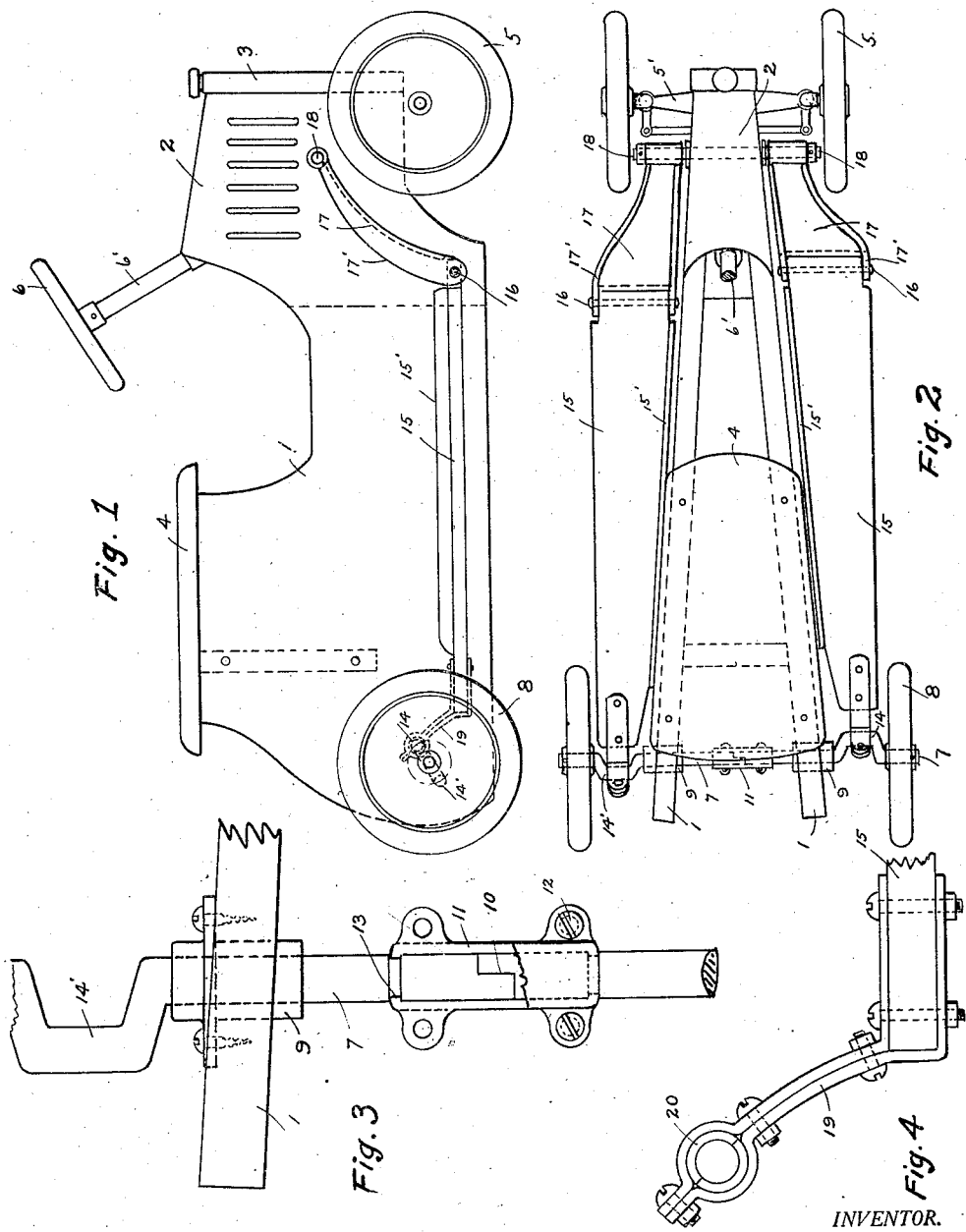

1,618,507

UNITED STATES PATENT OFFICE.

JULIEN A. BRIED, OF OAKLAND, CALIFORNIA.

FOOT-PROPELLED JUVENILE AUTOMOBILE.

Application filed April 30, 1925. Serial No. 27,028.

This invention relates to small foot propelled automobiles as used by children in play.

The objects of my invention are to provide a foot propelled, or juvenile automobile of this character which will be simple and cheap in construction, which will be more adapted to the very small and young child than the vehicles now used, in having a novel, more easily operated foot power drive, and safer than the present vehicles in overcoming the danger of a child rider upsetting with its feet caught in the treadles, as commonly now experienced.

Before describing my invention, it will be better to draw attention to the fact that as far as can be observed all of the foot power automobiles as used by children on the city side-walks are of one type only,—they have a two sided body including a seat, and between the sides, under the body they have the old and well known girls tricycle treadle drive connected to a pair of cranks on the rear axle.

This construction implies that when such a vehicle upsets, as is often the case, the child's feet being within the body on skeleton treadles, get tangled up with the treadle members in its effort to save itself, with the result that if it cannot extricate itself in time, it receives a bad injury in the upset, which likely as not is over the curb into the gutter.

From the construction outlined it is evident that these vehicles as now made are not suitable for very small or young children, and who have therefore been heretofore obliged to ride on the little kiddie kars as no attempt has been made to suit a foot power automobile to their use.

My invention shown in the accompanying drawings, provides a foot power automobile-like vehicle suitable for the very small child and overcomes the dangers above mentioned in having the treadles arranged along the outer sides of an automobile-like body, so that the child's feet when on the treadles in propelling position are never within the body as with the present vehicles.

This construction means that in case of the inevitable upset, the child's feet being already on the outside of the body cannot become entangled within it, but on the contrary, the child automatically spreads its feet to the floor or pavement thus preventing an impending fall.

In the drawings hereto, Figure 1 is a side elevation of my juvenile automobile, Figure 2 a plan view with the steering post broken off, Figure 3 an enlarged plan of a portion of the rear divided axle and showing one of its bearings in one side of the vehicle, and Figure 4 is an enlarged detail of the split bearing arm for the treadle crank drive connection to the rear axle.

In further detail the drawings show the automobile-like body of the vehicle to be composed of two sides 1 rearwardly diverging as shown in Figure 2.

The forward ends of the sides are suitably joined and shaped to form a hood portion 2, and a radiator 3 is secured to the front ends, while at the rear upper portion the sides carry a seat 4.

My invention will work equally well on a three or four wheeled vehicle, but in the embodiment shown two front wheels 5 are used to support the front of the vehicle and are carried on an axle 5', while a suitable steering wheel 6 mounted on a steering post 6' is arranged in the well known manner, not detailed, for steering the front wheels.

At the rear end of the automobile-like body is a driving axle 7 carrying at its extreme ends a pair of rear wheels 8, either one or both being secured to the axle for driving the vehicle.

The rear axle is supported for rotation by bearings 9 extending through the sides of the vehicle as shown in Figures 2 and 3, and the axle is preferably divided in the center at 10 so that either piece may be inserted through its bearing from the outside when assembling the vehicle, and after which the pieces of the axle are locked by passing into a tubular split clamp 11 which is clamped to the axle by screws 12, the extreme ends of the clamp being rolled inwardly as shown at 13 and entering grooves in the axle so as to locate the assemblage in a longitudinal direction and prevent the axle ends from pulling apart.

Between the rear wheels and the outside of the body the rear axle is provided with cranks 14—14' for driving the vehicle by means of foot treadles.

The foot treadles are fashioned from the runboards 15 of the automobile, and in fact constitute the runboards, and which instead of being immovably secured in place as is customary are pivotally suspended at their forward ends at 16 on links 17 in turn pivoted at 18 to the hood portion of the body.

The links 17 are preferably arched to take the form of the usual mud guards and they have side flanges 17' to position the toe of a child's foot, while the run boards 15 also have a flange 15' along the inner edge adjacent the body of the vehicle so that a child's foot when on the runboard-treadle will not scrape the side of the body.

At the rear ends the runboards are each connected with one of the cranks 14, 14', by an upwardly extending arm 19 having a split bearing 20 at its upper end engaging the crank.

The cranks may be set diametrically opposite to one another or at any angle desired, or instead of the crank driving connection to the treadles shown, any of the well known crank substitutes may be employed.

In operation a child sits upon the seat 4, holds the steering wheel 6 and places a foot on each runboard, preferably with the toe of the shoe against the curved link 17 between the flanges 17' and alternately swings the runboards on their link suspension to operate the vehicle through the crank connection described.

It will be seen that no outboard bearings are provided for the axle beyond the cranks, for while this could easily be done, cheapness of construction and ease of assembling are very essential, and since the device is for the use of mere babies I have found that with a substantial axle no outboard bearing is required, thus simplifying the construction.

The links or mudguards 17 being arched and limited in their forward movement by the throw of the cranks, do not interfere with the steering of the front wheels, or wheel, as the case may be.

In contemplating my invention it will be seen to provide a vehicle having all the characteristics of a juvenile automobile including runboards, yet suited to the very small and youngest of children by adapting the runboards to the driving of the rear wheels and thus maintain the feet of the child on the outside of the body to automatically protect it from injurious accidents as above explained.

I claim:

1. A juvenile vehicle comprising an automobile-like body with a seat thereon adapted for a child to sit upon, a pair of rear wheels supporting the rear end of the body, a pair of runboards one to either outer side of the body adapted to receive the feet of a child sitting on the seat, said runboards being pivotally suspended at their forward ends each by a link pivoted to the body and to the runboard and connected at their rear ends to transmit a turning effort to a rear wheel upon movement of the runboards on their link supports by the feet of the child.

2. A juvenile vehicle comprising an automobile-like body adapted to receive a child in sitting position, a rear axle supported in a pair of spaced bearings secured to the body and with a pair of road wheels at the ends thereof outside of the body, a pair of treadles outside of the body one to either side thereof adapted to receive each one foot of the child, said treadles being supported from the body for oscillation at their forward ends and their rearward ends being arranged to transmit a turning effort to the rear axle each at a point between a rear wheel and the outside of one of said bearings.

3. A juvenile vehicle of the character described including a body, a rear axle on the body with a pair of road wheels secured to the ends thereof, said axle being supported for rotation in spaced bearings on the body, a crank formed on the axle between each wheel and its adjacent bearing, and said axle being divided between the bearings and provided with means for securing the ends together.

4. A juvenile vehicle comprising a body, a rear axle on the body with a pair of road wheels at the ends thereof, said axle being supported for rotation in bearings on the body and having a crank formed adjacent each wheel outside of the bearings, a pair of treadles outside of the body one to either side thereof adapted to receive each one foot of the sitting child, said treadles being supported from the body for oscillation at their forward ends and their rearward ends being arranged to transmit a turning effort respectively to one of the cranks.

JULIEN A. BRIED.